United States Patent [19]

Witt, Jr.

[11] 4,165,388

[45] Aug. 21, 1979

[54] TORREFIED BARLEY FOR BREWER'S MASHES

[75] Inventor: Paul R. Witt, Jr., Muscatine, Iowa

[73] Assignee: Grain Processing Corporation, Muscatine, Iowa

[21] Appl. No.: 940,719

[22] Filed: Sep. 8, 1978

Related U.S. Application Data

[63] Continuation-in-part of Ser. No. 859,124, Dec. 9, 1977, abandoned.

[51] Int. Cl.² .......................... C12C 5/00; C12C 7/00; C12C 11/04
[52] U.S. Cl. ......................................... 426/16; 426/29; 426/445; 426/520
[58] Field of Search ........................ 426/11, 16, 28, 29, 426/445, 450, 520, 618

[56] References Cited

U.S. PATENT DOCUMENTS 3,576,645  4/1971  Rozsa ................................. 426/29 X

FOREIGN PATENT DOCUMENTS 1379116  1/1975  United Kingdom .

OTHER PUBLICATIONS

Britnell, J., Torrefied Cereals–Reassessment of their Potential, MBAA Technical Quarterly, vol. 10, No. 4, 1973 (pp. 176–179).
Hind, L. H., Brewing Science and Practice, vol. I, Chapman and Hall, Ltd., London, 1950 (pp. 71 and 72).

*Primary Examiner*—David M. Naff
*Attorney, Agent, or Firm*—Neuman, Williams, Anderson & Olson

[57] ABSTRACT

Torrefied, expanded barley for use as a partial replacement for malt in brewer's mashes is prepared by heating unmalted barley having a protein content of at least about 12% to a temperature sufficient to expand the barley to a degree that a given volume of barley before heating weights about 1.4 to about 1.75 times the weight of the same volume of barley after heating. Before heating, the unmalted barley preferably has a moisture content of about 12% to 20% by weight.

5 Claims, No Drawings

TORREFIED BARLEY FOR BREWER'S MASHES

This application is a continuation-in-part of my copending application Ser. No. 859,124, filed Dec. 9, 1977, now abandoned.

This invention relates to unmalted torrefied barley for partial replacement of the malt in brewer's mashes.

The production of malt is relatively expensive for several reasons, including the labor, time and equiment required for its production as well as the high cost of barley which is of suitable quality for malting. Reduction in the amount of malt required for beer production is thus economically desirable.

It is therefore a principal object of this invention to provide a replacement for a portion of malt normally used for beer production.

Another object of the invention is to make possible the use of undersized barley kernels in brewery mashes A further object of the invention is to make possible the use of unmalted barley in beer mashes and the like without causing run-off problems or reducing extract yield and without imparting off-flavors or flavor instability to the beer product.

Another object of the invention is to provide a process for producing a malt-substitute adjunct for brewer's mashes.

The present invention involves the discovery that torrefied unmalted barley can be advantageously employed as partial replacement of malt in brewery mashes. The torrefied barley can be used to replace up to about 25% of the malt in a mash with no adverse effect on mashing properties, fermentation or beer quality. The mash containing the torrefied barley can be used in conventional manner to produce non-distilled, fermented beverages such as beers, ales, lagers and the like.

As used herein, torrefied barley is unmalted barley having a protein content of no less than about 12%, dry basis, which is subjected to a heat treatment to expand the barley by a factor of about 1.4 to about 1.75. This expansion factor is achieved when a given volume of barley before heating weighs about 1.4 to 1.75 times the weight of the same volume of barley after being heated. The heat treatment of barley causes expansion and softening of the barley kernels. Various methods of heating can be employed to achieve the desired degree of expansion. Thus, heating can be accomplished with heated air, exposure to radiant heat, such as on a heat belt or by tumbling in a heated rotating cylinder, or by exposure to microwave or infrared radiation. The heat required to produce torrefied barley may vary with the energy source and the type of heating equipment employed and the protein content of the barley itself. However, a convenient measure of the proper degree of heat treatment is the degree of expansion of the barley. The heat treatment should be conducted to avoid charring of the barley.

After the heat treatment, the barley can be run through a flaking roll, if desired, but this is not necessary since the heat treated barley can be ground with the malt in the brewery. A common brewery practice is to grind malt by passing the malt between grinding rolls spaced from each other such that the malt is crushed sufficiently to permit good extraction of the carbohydrate, protein and other water soluble nutrients, but not so finely that too dense a filter mat is formed in the lauter tub causing filtration times to become excessive.

Thus, it is common practice to screen the barley to remove the undersize kernels because they are not adequately crushed in the grinding rolls and are not converted during the mashing. The undersized kernels are frequently sold at substantial discount for animal feeds. In addition, unmalted barley is difficult to grind and only the largest kernels are normally crushed in the grinding rolls, with undersized kernels passing through the rolls without undergoing crushing. This results in considerably reduced extraction efficiency. However, by heatinhg the unmalted barley as disclosed herein so as to cause an expansion or increase in size, undersized barley kernels are sufficiently expanded so that they can be ground satisfactorily with the malt.

In accordance with a particularly preferred embodiment of the invention, unmalted barley is tempered prior to heating. Tempering of the barley is accomplished by adjusting the moisture content thereof to within the range of about 12 to 20%, preferably about 14 to 18%. Water alone can be used to temper the barley, but it has been found beneficial to temper the barley prior to heating with an aqueous solution of a water soluble salt. It is believed that an aqueous solution of a salt is beneficial in the tempering process with respect to improving uniformity of heat treatment. Sodium bisulfite in the tempering solution is particularly beneficial with respect to promoting extraction and development of free alpha-amino nitrogen in the heat-treated barley. Examples of salts which are useful for use in the tempering solution are sodium bisulfite, sodium acetate, potassium bromate, potassium bisulfate, sodium hydrosulfite, sodium thiosulfite, sodium bisulfate, sodium bromate and sodium chloride. The tempering treatment can be accomplished in a variety of ways. Thus, for example, the tempering solution can be sprayed on the barley as it flows into a bin or it may be pumped into a bin that has been filled with the barley and allowed to flow down through the grain. Spraying the tempering solution onto the barley generally provides more uniform results. Heating of the barley may follow immediately after the tempering step or preferably it may take place at a subsequent time.

The following examples further illustrate the invention and the advantages thereof.

EXAMPLE 1

A series of beer mashes was prepared using various concentrations of torrefied barley that has been tempered with water before the heat treatment with infrared radiation. The barley was torrefied in a modified Micronizer of the type described in U.S. Pat. No. 3,701,670. The Micronizer machine described in said patent was modified so that the barley was conveyed by a traveling wedge-wire belt rather than a tilted vibrating plate. The grain is fed from a hopper by means of a vibrating feeder on to the belt at a rate such that the layer of grain on the belt is only one kernel thick. The belt vibrates to turn the kernels so they are exposed uniformly to the radiation. The grain passes under ceramic plates which are heated from above by gas flames to the point where the plates are red hot and emit infrared radiation having a wavelength in the range of 1.8 to 6 microns. The belt speed may be varied to control the retention time, usually about 20 seconds, and thus the temperature attained, usually about 190° C., by the grain before it reaches the end of the belt. Feed rate and gas consumption also may be varied. From the belt the cereal drops into a conveyor-cooler by which it goes to storage. Using this type of heating device, the torrefied or heat-treated barley exhibited an expansion factor of about 1.5.

The mash contained 65% malt and 35% corn grits. The wort solids concentration was 12.5° P±0.2. The malt was prepared from Larker barley and the torrefied barley also was Larker type.

TABLE 1

| | Malt Replacement, % dry basis | | | | |
|---|---|---|---|---|---|
| | 0 & 5 | 10 | 15 | 20 | 25 |
| Conversion time, min. | 18 | 18 | 18 | 19 | 22 |
| Run-off time, min. | 125 | 125 | 125 | 130 | 150 |
| 1st. Wort, °P | 17.85 | 17.95 | 18.0 | 18.1 | 17.8 |
| Last Wort, °P | 1.25 | 1.20 | 1.35 | 1.4 | 1.82 |
| Kettle extract, % dry materials | 78.5 | 78.5 | 78.5 | 78.6 | 77.3 |
| Color, °Lovibond | 3.1 | 3.0 | 2.8 | 2.7 | 2.9 |

Good run-off time and extraction efficiencies were obtained although the highest replacement level was not as good as the other levels.

EXAMPLE 2

This example demonstrates the effect of the addition of various levels of water in the tempering step. The barley used was B grade Larker with 12.5% moisture. The heating was done with infrared radiation in a Micronizer at 188°–190° C.

| | Added Barley Moisture, % | | | | |
|---|---|---|---|---|---|
| | 0 | 1.1 | 2.3 | 4.7 | 7.1 |
| Expansion Factor | 1.47 | 1.49 | 1.58 | 1.67 | 1.72 |
| Moisture After Heating, % | 5.1 | 5.4 | 7.0 | 8.8 | 11.1 |

EXAMPLE 3

In order to demonstrate the benefit of the use of various salt solutions in the tempering step, the following test was run. The barley used was Beacon var., B grade at 12.6% moisture. The barley was tempered with the various solutions over-night. The heating step was done in a Litton microwave oven using two exposure times of 1.5 minutes each with 300 grams of barley in each test. The use of 20 milliliters of solution results in a moisture of about 16.5 to 17.0%. The addition of 30 milliliters of solution results in a moisture of about 19%.

| Addition to Barley | | Milligrams Salt/100 gm Barley | Expansion Factor | | |
|---|---|---|---|---|---|
| | | | | | |
| None | | | 1.56 | | |
| Water, 20 ml/300 gm | | | 1.63 | | |
| | | | pH 3.2 | pH 4.3 | pH 5.5 |
| 0.025% NaHSO$_3$ | 20 ml | 1.7 | 1.66 | 1.69 | 1.70 |
| 0.10 NaHSO$_3$ | 20 ml | 6.7 | 1.74 | 1.72 | 1.69 |
| 0.10 NaHSO$_3$ | 30 ml | 10.0 | 1.73 | 1.73 | 1.72 |
| 0.5 NaHSO$_3$ | 20 ml | 33.3 | 1.70 | 1.69 | 1.67 |
| 0.1% Sodium acetate | 30 ml | 10 | | 1.72 | |
| 0.5 Sodium acetate | 30 ml | 50 | | 1.76 | |
| 0.1% KBrO$_3$ | 30 ml | 10 | | 1.72 | |
| 0.5 KBrO$_3$ | 30 ml | 50 | | 1.63 | |
| 0.1% KHSO$_4$ | 30 ml | 10 | | 1.77 | |
| 0.5 KHSO$_4$ | 30 ml | 50 | | 1.75 | |
| 0.1% Na$_2$SO$_3$ | 30 ml | 10 | | 1.55 | |
| 0.5 Na$_2$SO$_3$ | 30 ml | 50 | | 1.58 | |
| 0.55% H$_2$SO$_4$ | 30 ml | 55 | | 1.53 | |
| 0.1% Na$_2$S$_2$O$_4$ | 20 ml | 6.7 | | 1.72 | |
| | 30 ml | 10.0 | | 1.80 | |
| 0.5% | 20 ml | 33.3 | | 1.69 | |
| | 30 ml | 50.0 | | 1.65 | |
| 0.1% Na$_2$S$_2$O$_3$ | 20 ml | 6.7 | | 1.72 | |
| | 30 ml | 10.0 | | 1.72 | |
| 0.5% | 20 ml | 33.3 | | 1.68 | |
| | 30 ml | 50.0 | | 1.64 | |
| 0.1% NaCl | 20 ml | 6.7 | | 1.64 | |
| | 30 ml | 10.0 | | 1.72 | |
| 0.5% | 20 ml | 33.3 | | 1.67 | |
| | 30 ml | 50.0 | | 1.76 | |

It is apparent that various inorganic salts improve the expansion factor obtained by heating under fixed conditions.

EXAMPLE 4

B grade barley was tempered by the addition of water to about 15.5 to 16.0% moisture and held for varying lengths of time to illustrate the effect on expansion of the time between tempering and heating. The tempered and stored barley was heated at 188°–190° C. by infrared radiation in a modified Micronizer apparatus as described in Example 1.

| Time (hours) between Tempering and Heating | Expansion Factor |
|---|---|
| 1 | 1.57 |
| 5 | 1.60 |
| 20 | 1.71 |

EXAMPLE 5

Barley was heated at various temperatures immediately after tempering and after overnight storage. The cereal was B grade Larker barley tempered with water to 15.5 to 16.0% moisture. Heating was accomplished by infrared radiation in a modified Micronizer as described in Example 1.

| Storage Time | | Heating Temp, °C. | Expansion Factor | Screen, % | | | |
|---|---|---|---|---|---|---|---|
| 1 Hr | Over-Night | | | on 6/64, | on 5-1/2/64, | on 5/64 | Thru |
| — | — | — | — | 72 | 24 | 4 | neg. |
|  | X | 160 | 1.38 | 80 | 17 | 3 | neg. |
| X |  | 180 | 1.39 | 78 | 18 | 3 | neg. |
|  | X | 180 | 1.48 | 85 | 12 | 3 | neg. |
| X |  | 190 | 1.58 | 86 | 12 | 2 | neg. |
|  | X | 190 | 1.70 | 91 | 8 | 1 | neg. |
| X |  | 205 | 1.69 | 93 | 6 | 1 | neg. |

The improvement in expansion factor from overnight storage after tempering was apparent at both 180° and 190° C. heating. The screen analysis demonstrates the improvement in kernel size, especially with respect to reducing the amount on 5.5/64 and 5/64 sizes.

EXAMPLE 6

E grade barley which is undersized and normally is too small for malting was tempered with water, 0.5 and 1% NaHSO₃ followed by heating with infrared radiation in a modified Micronizer apparatus as previously described. The products were used in brewing tests with and without cleaning through a 5.5/64 hand sieve. Cleaning removed most of the hard and only slightly expanded kernels. The mash was 55.25% malt, 35% corn grits with a 9.75% treated barley replacement of the malt.

The brewing test consists of first mixing the ground barley samples with the ground malt in water in the mash tub at 45° C. The total concentration of grain in the water is about 33% on a dry basis. Simultaneously, 22% corn grits is added to the cooker and boiled and both of these slurries are held for 30 minutes. The boiling starch slurry is then dropped into the malt-barley mixture raising the temperature to about 68° C. where it is held for 10 minutes following which the temperature is raised to about 73° C. and held until no blue color develops when the solution is tested with an iodine solution. The time required to raise the temperature to 73° C. and convert the starch is 18 to 20 minutes. At this point, the mash contains about 18% dissolved solids and it is dropped to the lauter tub to filter the wort from the residual grains. The grains are successively sparged with water until the washings contain about 1.5% solids at which time the combined wort solids are about 12.5 to 13%. This wort is boiled, cooled and placed in a fermentor, inoculated with 10 million cells of the brewers' yeast, *Saccharomyces carlsbegensis*/milliliter and allowed to ferment at about 13° C. until fermentation is completed as indicated by cessation of activity and yeast flocculation.

| Temper Medium | None | Plain Water | 0.5% NaHSO₃ | 1.0% NaHSO₃ | |
|---|---|---|---|---|---|
| Temperature, °C. | 195 | 205 | 205 | 205 | |
| Production, lb/hr | 1200 | 2500 | 2500 | 2500 | |
| | As is | Cleaned | As is | Cleaned | As is | Cleaned | As is | Cleaned |
| Expansion Factor | 1.46 | 1.57 | 1.38 | 1.54 | 1.74 | 1.73 | — | — |
| Run off, min. | 134 | 128 | 110 | 120 | 140 | 130 | 150 | 145 |
| 1st Wort, °P | 17.31 | 17.56 | 16.40 | 17.35 | 17.35 | 17.44 | 17.68 | 17.66 |
| Last Wort | 2.02 | 1.78 | 2.85 | 1.67 | 1.85 | 1.43 | — | — |
| Kettle Yield | 77.6 | 78.3 | 75.2 | 78.0 | 78.0 | 78.2 | 78.9 | 78.8 |

A lower production rate of 1200 lbs/hour (at 195° C.) without temper resulted in a product of comparable or slightly lower extract yield when compared with sodium bisulfite tempered barley processed at a rate of 2500 pounds per hour. Water tempering supporting a 2500 pound per hour production rate resulted in a low expansion factor and an unsatisfactory extract yield. This was remedied by removal of the under-modified or hard kernels.

EXAMPLE 7

The effect of the use of a bisulfite solution for tempering on alpha amino nitrogen extraction is shown in this Example. E grade Larker barley was tempered with water or with 0.3% NaHSO₃ solution to a moisture level of about 16% and heated with infrared radiation in a modified Micronizer as previously described. The treated barley, having an expansion factor of 1.69, then was used in a mash consisting of 55.25% malt, 35% grits at a 9.75% replacement level of the malt.

| Mash Composition | Alpha-Amino Nitrogen of Wort, mg/l |
|---|---|
| 1. 65% malt, 35% grits | 176 |
| 2. Composition #1 with 15% of malt replaced with water-tempered and heated barley | 158 |
| 3. Composition #1 with 15% of malt replaced with bisulfite solution tempered and heated barley | 174 |

EXAMPLE 8

The effect of heat treatment on small-sized barley kernels is shown in this Example. E grade Larker barley was tempered with a bisulfite solution and heated with infrared radiation in a modified Micronizer as previously described. The so-treated barley was screened with 7, 6 and 5/64 slotted grain sieves and compared with the screen profiles of B and E grade untreated Larker barley and the malts made therefrom.

| Screen | B Grade | | E Grade | | |
|---|---|---|---|---|---|
| | Barley | Malt | Barley | Malt | Heated |
| 7/64 | 6.5% | 30.0% | 0.0% | 6.1% | 35.1% |
| 6/64 | 43.0% | 47.1% | 0.0% | 29.7% | 41.8% |
| 5/64 | 37.5% | 21.1% | 9.9% | 54.0% | 20.9% |
| Thru | 6.0% | 1.8% | 91.1% | 10.2% | 2.2% |

It is apparent that the E grade, small kernel barley is not plumped sufficiently in malting to be adequately crushed during grinding for mashing operations. The treated or heated E grade barley, however, has essentially the same screen profile as malt from B grade barley.

|  | Control Mash | Experimental Mashes | | | Average of 1,2&3 |
| --- | --- | --- | --- | --- | --- |
|  |  | 1 | 2 | 3 |  |
| Run-off | Normal | Normal | Normal | Normal | Normal |
| First wort, °P | 17.60 | 17.80 | 17.53 | 17.77 | 17.68 |
| Kettle, °P | 12.71 | 12.68 | 12.74 | 12.72 | 12.71 |
| Total extract, % dry | 79.6 |  |  |  | 79.5 |
| Malt Extract, % dry | 74.3 |  |  |  |  |
| Barley extract, % dry |  |  |  |  | 74.9 |
| Soluble protein, gm/100 ml | 0.548 | 0.525 | 0.534 | 0.529 | 0.529 |
| Alpha-Amino Nitrogen mg/liter | 176 | 160 | 156 | 157 | 158 |

EXAMPLE 9

The effect of temperature level in the heating step in a modified Micronizer as previously described was studied with B grade Larker barley that has been water tempered to 15.5 or 16.0% moisture.

| Micronizer Temp °C. | Expansion Factor | Modification | *Brew Performance | |
| --- | --- | --- | --- | --- |
|  |  |  | Run-off hr, min | Barley Extract % Dry |
| 177–178° C. | 1.35 | Hard | 2 hrs normal | 70.8 |
| 185–188° C. | 1.59 | Mellow | 2 hrs normal | 74.0 |
| 190–192° C. | 1.72 | Mellow | 2 hrs 20 min sl longer normal | 74.6 |
| 205–208° C. | 1.81 | Mellow | 12 hrs 40 min slow | 74.8 |
| 220–225° C. | 1.94 | Mellow | 3 hrs slow | 75.4 |

*Note:
Malt prepared from this barley gave a brewhouse yield of 74.3%, dry basis. Micronized barley replaced 15% of the malt in the mash tub. Mashing was 65% malt × 35% corn grits, producing kettle wort of 12.4–12.7° P. Brews with micronized barley are average values of 3 or more brews.

EXAMPLE 10

This example illustrates the use of microwave energy for heat treating barley. Samples of water tempered and untempered barley were placed in a Litton microwave oven and heated for 1.5 minutes. The heating was accomplished by placing 50 gram portions of tempered barley in six-inch diameter glass Petrie dishes. The test was repeated, but after the first 1.5 minutes the samples were rotated to expose all of the kernels to the heat source and the heat continued for an additional 1.5 minutes.

|  | Expansion Factor | |
| --- | --- | --- |
| Tempering Treatment | Heated 1.5 min. | Heated 1.5 + 1.5 min. |
| None | 1.47 | 1.56 |
| 20 ml water/300 gm barley | 1.54 | 1.63 |

EXAMPLE 11

This example sets forth results of tests conducted in a commercial brewery. B grade Larker barley that had been treated by tempering with water and heated with infrared radiation according to this invention was used to replace 15% of the malt in a mash that normally contains 65% malt and 35% grits. The heat treated barley was prepared by heating it to 185°–188° C. with infrared radiation and had an expansion factor of 1.56. It was ground separately in a brewery mill and mixed with ground malt in a mash tub. The brewery test was as described in Example 6.

Beer quality and storage or keeping properties of the experimental batches were excellent in all respects and comparable to the control beer. Factors which were considered include: conversion of the starch as measured by the iodine test for residual starch, run-off time, which is the length of time to filter the solubles from the grains, and yield of extract from the materials used in the mash; proper ratio of fermentable sugars and desirable nitrogen content; normal fermentation rate and degree, i.e., the amount of soluble solids that are fermented to $CO_2$ and alcohol; and normal flavor and clarity and the stability thereof during shelf-life.

EXAMPLE 12

Colorado barley was heated without tempering in a Cabomatic machine which is described in U.S. Pat. No. 3,650,199. This machine operates on the basis of direct-fired heated air. Gas is burned in the furnace and the hot combustion gases contact the grain directly as it is carried upwards by these gases, dropping down to be picked up again and in this fashion moves from one end to the other of the machine. The grain entering the heating chamber is preheated by the exhaust gases. The retention time is believed to be 2 to 2.5 minutes.

Samples of the barley were taken from the machine operating at 271° C. air temperature and compared in brewing procedures with a malt-corn grits control as well as a mash with 15% of the malt replaced with Beacon barley that was tempered and heated with infrared radiation.

|  | Mashes with 15% of Malt Replaced with Barley | | |
| --- | --- | --- | --- |
| Brewing Characteristic | Control Mash | Infrared Heated | Hot-Air Heated at 271° C. |
| Barley Expansion | — | 1.64 | 1.73 |
| Conversion, min. | 18 | 19 | 19 |
| Run-off time | 2 hr 8 min | 2 hr 20 min | 2 hr 2 min |
| Extract, % dry |  |  |  |
| Malt | 74.3 | — | — |
| Barley | — | 74.2 | 74.0 |
| Alpha-Amino Nitrogen Mg/Liter | 176 | 144 | 151 |

The results show that barley treated with hot air at the proper temperature can be brewed equally as well as that treated with infrared radiation.

EXAMPLE 13

Barley was torrefied in a Jet Sploder which is a hot air cereal treating machine and is described in U.S. Pat.

No. 3,861,058. The following data indicate satisfactory results with this apparatus also.

| Expansion Factor | Run-off Time | Cooler Solids | Kettle Material Extract | Extraction Efficiency % | Alpha-Amino Nitrogen Mg/Liter | Protein g/100 ml |
|---|---|---|---|---|---|---|
| 1.58 | 2 hrs, 9 min | 12.81° P | 80.0% | 97.0 | 163 | 0.485 |

A number of advantages offered by the present invention are readily apparent. First, the invention makes possible a significant reduction in the use of costly malt for production of beer and similar fermented beverages. The use in beer production of unmalted torrefied barley as disclosed herein does not require the use of additional enzymes other than those normally found in malt nor is there any contribution of off-flavor or flavor instability from the use of the torrefied barley. The disclosed treatment of unmalted barley enables the use in beer production of undersized barley kernels which heretofore have been unsuitable for use.

Those modifications and equivalents which fall within the spirit of the invention are to be considered a part thereof.

What is claimed is:

1. A process for producing torrefied, unmalted barley for use as a malt substitute in a brewer's mash which is used to produce a non-distilled, fermented beverage which comprises heating unmalted barley having a protein content of at least 12% to a temperature sufficient to expand the unmalted barley to the extent that a given volume of barley before heating weighs about 1.4 to 1.75 times the weight of the same volume of barley after heating and recovering the heat-treated barley as said torrefied unmalted barley.

2. A process in accordance with claim 1 wherein prior to heating the moisture content of the unmalted barley is adjusted to about 12 to about 20% by weight.

3. A process in accordance with claim 1 wherein the moisture content of the unmalted barley is adjusted using an aqueous solution of a water soluble salt.

4. A process in accordance with claim 3 wherein sodium bisulfite is used as the water soluble salt.

5. In a process for producing a non-distilled, fermented beverage from a malt-containing mash, the improvement which consists in employing in the mash, in lieu of a portion of the malt, torrefied unmalted barley produced as set forth by claim 1.

* * * * *

UNITED STATES PATENT AND TRADEMARK OFFICE
CERTIFICATE OF CORRECTION

PATENT NO. : 4,165,388

DATED : August 21, 1979

INVENTOR(S) : PAUL R. WITT, JR.

It is certified that error appears in the above-identified patent and that said Letters Patent are hereby corrected as shown below:

In the Abstract, line 6, "weights" should be -- weighs --

Column 2, line 11, "heatinhg" should be -- heating --

Column 7, line 30, under the column headed "Run-off hr, min" in the table, "12 hrs" should be -- 2 hrs --

Column 8, line 54, after "Barley Expansion" insert -- Factor --

Signed and Sealed this

Thirteenth Day of November 1979

[SEAL]

Attest:

RUTH C. MASON
Attesting Officer

LUTRELLE F. PARKER
Acting Commissioner of Patents and Trademarks